US009916257B2

(12) United States Patent
Sankaran et al.

(10) Patent No.: US 9,916,257 B2
(45) Date of Patent: Mar. 13, 2018

(54) METHOD AND APPARATUS FOR TLB SHOOT-DOWN IN A HETEROGENEOUS COMPUTING SYSTEM SUPPORTING SHARED VIRTUAL MEMORY

(75) Inventors: Rajesh M. Sankaran, Portland, OR (US); Altug Koker, El Dorado Hills, CA (US); Philip R. Lantz, Cornelius, OR (US); Asit K. Mallick, Saratoga, CA (US); James B. Crossland, Banks, OR (US); Aditya Navale, Folsom, CA (US); Gilbert Neiger, Portland, OR (US); Andrew V. Anderson, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 923 days.

(21) Appl. No.: 13/191,327

(22) Filed: Jul. 26, 2011

(65) Prior Publication Data
US 2013/0031333 A1    Jan. 31, 2013

(51) Int. Cl.
G06F 12/10     (2016.01)
G06F 12/1027   (2016.01)
G06F 12/1081   (2016.01)

(52) U.S. Cl.
CPC ...... *G06F 12/1027* (2013.01); *G06F 12/1081* (2013.01); *G06F 2212/1016* (2013.01);
(Continued)

(58) Field of Classification Search
CPC ............. G06F 12/1027; G06F 12/0815; G06F 2212/682; G06F 12/1072; G06F 12/1009
(Continued)

(56) References Cited

U.S. PATENT DOCUMENTS 6,175,876 B1    1/2001  Branson et al.
7,069,389 B2 *  6/2006  Cohen .......................... 711/135
(Continued)

FOREIGN PATENT DOCUMENTS

CN    102023932 A    4/2011
JP    2005158040 A    6/2005
(Continued)

OTHER PUBLICATIONS

"Lazy TLB consistency for large-scale multiprocessors", Moon-Seok Chang and Kern Koh, Parallel Algorithms/Architecture Synthesis, 1997. Proceedings., Second Aizu International Symposium, Mar. 17-21, 1997 pp. 308-315.*
(Continued)

*Primary Examiner* — Michael Alsip
(74) *Attorney, Agent, or Firm* — Nicholson De Vos Webster & Elliott LLP

(57) ABSTRACT

Methods and apparatus are disclosed for efficient TLB (translation look-aside buffer) shoot-downs for heterogeneous devices sharing virtual memory in a multi-core system. Embodiments of an apparatus for efficient TLB shoot-downs may include a TLB to store virtual address translation entries, and a memory management unit, coupled with the TLB, to maintain PASID (process address space identifier) state entries corresponding to the virtual address translation entries. The PASID state entries may include an active reference state and a lazy-invalidation state. The memory management unit may perform atomic modification of PASID state entries responsive to receiving PASID state update requests from devices in the multi-core system and read the lazy-invalidation state of the PASID state entries. The memory management unit may send PASID state update responses to the devices to synchronize TLB entries prior to
(Continued)

activation responsive to the respective lazy-invalidation state.

20 Claims, 6 Drawing Sheets

(52) U.S. Cl.
CPC ............... *G06F 2212/1048* (2013.01); *G06F 2212/303* (2013.01); *G06F 2212/682* (2013.01); *G06F 2212/683* (2013.01)

(58) Field of Classification Search
USPC .......................................... 711/135, 206, 207
See application file for complete search history.

(56) References Cited

U.S. PATENT DOCUMENTS

| | | |
|---|---|---|
| 7,447,867 B2 | 11/2008 | Soja et al. |
| 2011/0022818 A1* | 1/2011 | Kegel et al. ................... 711/206 |
| 2011/0023027 A1* | 1/2011 | Kegel et al. ....................... 718/1 |
| 2011/0035551 A1 | 2/2011 | Hooker et al. |
| 2011/0125983 A1 | 5/2011 | Stecher |
| 2011/0131388 A1 | 6/2011 | Chen et al. |
| 2013/0179971 A1 | 7/2013 | Harrison |

FOREIGN PATENT DOCUMENTS

| | | |
|---|---|---|
| JP | 5956754 B2 | 7/2016 |
| TW | 201106264 A | 2/2011 |
| WO | 2011011768 A1 | 1/2011 |

OTHER PUBLICATIONS

David L. Black, et al, "Translation Lookaside Buffer Consistency: A Software Approach," 1989 ACM 0-89791-300-0/89/0004/0113, Carnegie Mellon University, Pittsburgh, PA 15213, 10 pages.
"ARM Architecture Reference Manual," 1996-1998, 2000, 2004, 2005, ARM DDI 01001, ARM LTD, 110 Fulbourn Road, Cambridge, England CB1 9NJ, 1138 pages.
"ARM Architecture Reference Manual, ARMv7-A and ARM v7-R Edition," 1996-1998, 2000, 2004-2007, ARM DDI 0406A, ARM Ltd, 110 Fulbourn Road, Cambridge, England CB1 9NJ, 2080 pages.
David Brash, The ARM Architecture Version 6 (ARMv6), ARM White Paper, Jan. 2002, 15 pages.
Bogdan Romanescu, et al, "UNified Instruction/Translation/Data (UNITD) Coherence: One Protocol to Rule Them All." Duke University, Jan. 2010, 16th International Symposium on High-Performance Computer Architecture (HPCA), Bangalore, India, 12 pages.
Roberto Mijat, et al, "Virtualization is Coming to a Platform Near You, the ARM R Architecture Virtualization Extensions and the Importance of System MMU for Virtualized Solutions and Beyond," ARM LTD White Paper, 2010-2011, 12 pages.
Nvidia "CUDA 4.0 Overview," GPU Technology Conference Oct. 11-14, 2011, San Jose, CA, www.gputechconf.com, 31 pages.
"Notification of Transmittal of the International Search Report and the Written Opinion of the International Searching Authority or the Declaration," PCT/US2012/047991, Korean Intellectual Property Office, Republic of Korea, dated Feb. 13, 2013, 8 pages.
"Notification Concerning Transmittal of International Preliminary Report on Patentability" PCT/US/2012/047991, The International Bureau of WIPO, Geneva 20, Switzerland, dated Feb. 6, 2014, 5 pages.
Office action with summarized English translation from Chinese Patent Application No. 201280031876.1, dated Nov. 5, 2015, 21 pages.
Office action with summarized English translation from Japanese Patent Application No. 2014-522944, dated Feb. 9, 2016, 5 pages.
Notice of Allowance from Korean Patent Application No. 10-2014-7002511, dated Dec. 14, 2015, 3 pages.
Office action with summarized English translation from Korean Patent Application No. 10-2014-7002511, dated Feb. 2, 2015, 14 pages.
Office action with summarized English translation from Korean Patent Application No. 110-2014-7002511, dated Sep. 23, 2015, 5 pages.
Notice of Allowance from Taiwan Patent Application No. 101126812, dated Mar. 25, 2015, 2 pages.
Office action and Search Report with English translation of Search Report from Taiwan Patent Application No. 101126812, dated Nov. 27, 2014, 22 pages.
Office action with summarized English translation from Japanese Patent Application No. 2014-522944, dated Mar. 24, 2015, 5 pages.
Decision to Grant a Patent for foreign counterpart Japanese Patent Application No. 2014-522944, dated Sep. 16, 2016, 4 pages.
Notice on Grant of Patent Right for Invention for foreign counterpart China Application No. 201280031876.1, dated Sep. 2, 2016, 4 pages.

\* cited by examiner

METHOD AND APPARATUS FOR TLB SHOOT-DOWN IN A HETEROGENEOUS COMPUTING SYSTEM SUPPORTING SHARED VIRTUAL MEMORY

FIELD OF THE DISCLOSURE

This disclosure relates generally to the fields of computing and/or communications. In particular, the disclosure relates to efficient TLB (translation look-aside buffer) shoot-downs for heterogeneous devices sharing virtual memory in a multi-core system.

BACKGROUND OF THE DISCLOSURE

Modern processors often include caches to improve the performance of accessing external memory by providing copies of instructions and/or data in smaller faster memories with shorter access latencies. In addition such caches may provide support for fast virtual to physical address translations using a device such as a translation lookaside buffer (TLB) to cache virtual to physical address translations, for example from the system page tables in a paged virtual memory system. When a TLB matches a virtual address to one of the translations stored in the TLB, we may refer to such and event as a TLB hit and the retrieved physical address can be used to access memory in a cache or in main memory more quickly. When a TLB fails to match a virtual address to one of the translations stored in the TLB, we may refer to such and event as a TLB miss or a page miss, and the translation proceeds by looking up the corresponding page tables in memory.

A typical multi-core processor or multi-core processing system may have various homogeneous or heterogeneous processing devices—for example, some number of homogeneous processor cores together with one or more heterogeneous graphics processors or video processors, etc. These homogeneous or heterogeneous processing devices may share virtual memory address spaces. Typically, the homogeneous processor cores may have cache hierachies and TLBs as described above to cache virtual to physical address translations from the system page tables in a paged virtual memory system. In modern processors the homogeneous processor cores may also include a page-miss handler (PMH) in hardware to perform page walks through system page tables more quickly. When one of these homogeneous processor cores tries to access a page in virtual memory that is not mapped to anything in physical memory, the memory access will cause a page fault, and the operating system will be invoked to "fix" the problem.

The heterogeneous processing devices, such as graphics processors may also have mechanisms such as TLBs for performing virtual to physical address translations, but typically there is some software that runs on the homogeneous processor cores and may communicate with drivers for the heterogeneous processing devices to set up page tables, etc. for some limited sharing of the paged virtual memory system with the heterogeneous processing devices. But unlike in the homogeneous processor cores, these mechanisms may have limited capabilities, lacking the ability to handle page faults, for example. Therefore the pages that are shared with these heterogeneous processing devices may need to be locked down in memory, preventing the operating system from paging them in from, and out to disk as demand dictates. Thus the number of applications that can be supported may be limited, or the amount of physical memory required may be greater than it would otherwise have been.

Further the software that runs on the homogeneous processor to set up page tables, etc. for sharing paged virtual memory with the heterogeneous processing devices incurs a performance overhead, which may reduce the effectiveness of using the heterogeneous processing devices.

When software running on the homogeneous processor cores (e.g. the operating system) makes changes to the page tables, the corresponding translations that are cached in various TLBs throughout the system must be invalidated. This is known as a TLB shoot-down. One simple approach is to broadcast an invalidation message to all devices in the system, but this may cause unwanted communication congestion. Moreover, page tables set up for the heterogeneous processing devices may not be the same page tables used by the homogeneous processor cores, and the mechanisms used in the heterogeneous processing devices may have limited capabilities to invalidate their TLB entries and to recover new page table information on their own.

In order to avoid unwanted congestion, operating systems have used a form of lazy invalidation scheme. Since the operating system is running on the homogeneous processor cores and has access to which of the processes, applications or threads are active on the various homogeneous processor cores, it could "shoot-down," or trigger an invalidation of TLB entries as necessary, i.e. only in the TLBs of cores which were actively running a process that used that TLB entry, and/or in the TLBs of cores that may want to activate a process that will use that TLB entry. Thus unnecessary activity and overhead for TLB shoot-downs could be avoided. But since the operating system does not run on the heterogeneous processing devices, it cannot track which processes are active and which TLB entries may need to be invalidated, even if we assume that the heterogeneous processing devices are capable of recovering the new page table information and/or generating page faults. Therefore a broadcast would need to be sent to all of the heterogeneous processing devices potentially sharing the process virtual address space.

As the number of processing cores and other heterogeneous processing devices accessing caches or using virtual memory increases, there may be good reason to expect problems, such as additional memory congestion, and conflicts when virtual memory space is shared by more of these devices. To date, potential solutions to such reasonably expected problems have not been adequately explored.

BRIEF DESCRIPTION OF THE DRAWINGS

The present invention is illustrated by way of example and not limitation in the figures of the accompanying drawings.

DETAILED DESCRIPTION

Methods and apparatus are disclosed for efficient TLB (translation look-aside buffer) shoot-downs for heterogeneous devices sharing virtual memory in a multi-core system. Embodiments of an apparatus for efficient TLB shoot-downs may include a TLB to store virtual address translation entries, and a memory management unit, coupled with the TLB, to maintain PASID (process address space identifier) state entries corresponding to the virtual address translation entries. The PASID state entries may include an active reference state and a lazy-invalidation state. The memory management unit may perform atomic modification of PASID state entries responsive to receiving PASID state update requests from devices in the multi-core system and read the lazy-invalidation state of the PASID state entries. The memory management unit may send PASID state update responses to the devices to synchronize TLB entries prior to activation responsive to the respective lazy-invalidation state.

These and other embodiments may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

Figure 1:
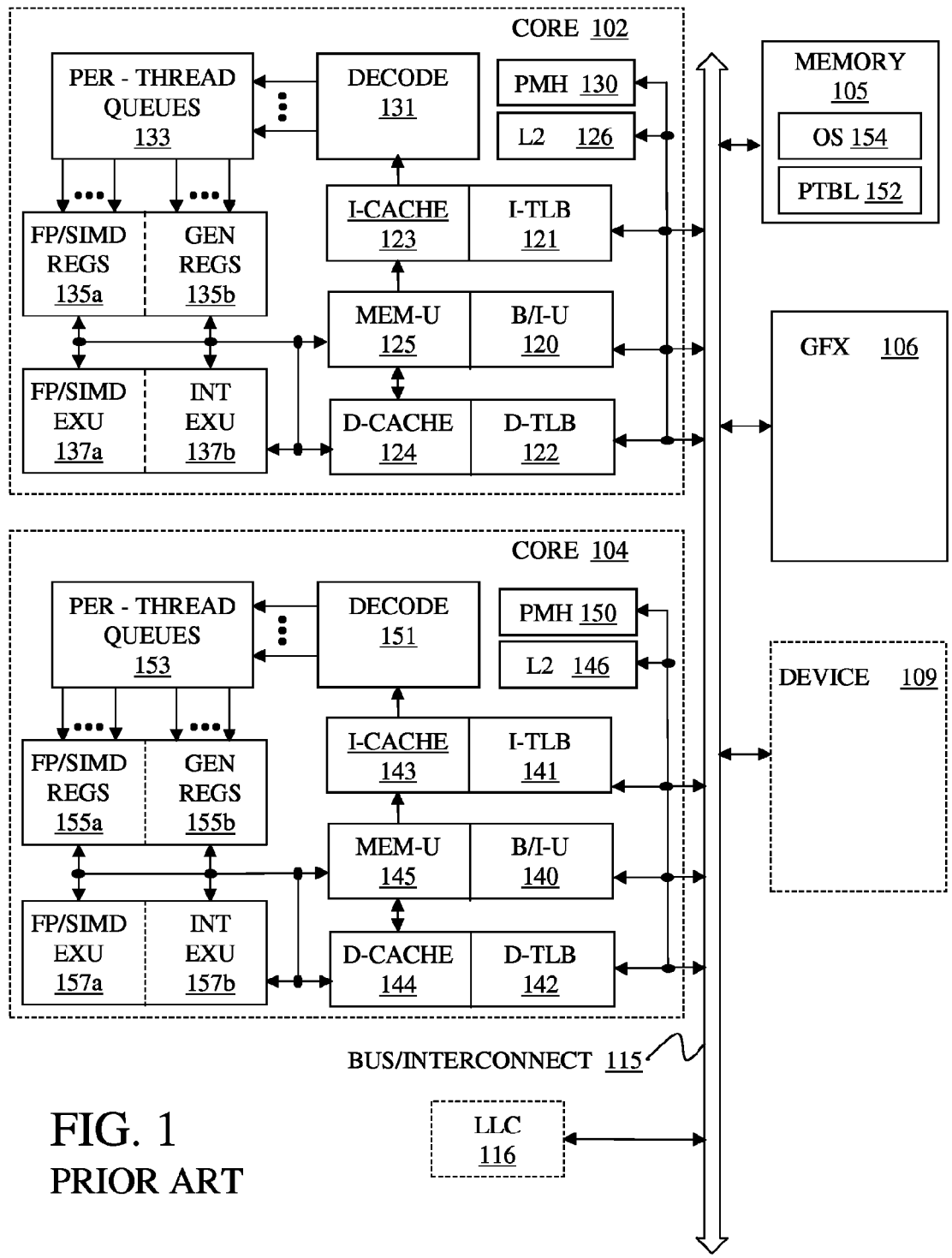
FIG. 1 illustrates a prior art technique for sharing virtual memory in a multi-core system with heterogeneous devices.

FIG. 1 illustrates a prior art technique for sharing virtual memory in a multi-core system with heterogeneous devices. A multi-core processor or multi-core processing system may have various homogeneous or heterogeneous processing devices. For example, the system of FIG. 1 has some number of homogeneous processor cores, two of which are shown as core 102 and core 104, together with one or more heterogeneous graphics processors, such as GFX 106 or video processors, say for example, device 109. Core 102 and core 104 may be multi-threaded cores processing multiple process threads for execution via decode 131 and decode 151, per-thread queues 133 and 153, floating point/single-instruction multiple-data registers FP/SIMD REGS 135a and FP/SIMD REGS 155a, general registers GEN REGS 135b and GEN REGS 155b, floating point/single-instruction multiple-data execution units FP/SIMD EXU 137a and FP/SIMD EXU 157a, and integer execution units INT EXU 137b and INT EXU 157b, respectively. Core 102 and core 104 may also be coupled with a physical memory 105 via a bus/interconnect 115 and memory units MEM-U 125 and MEM-U 145 through bus/interconnect units B/I-U 120 and B/I-U 140, respectively. Core 102 and core 104 may also be coupled with heterogeneous processing devices GFX 106 and device 109 via physical memory 105 and bus/interconnect 115 and optionally last level cache, LLC 116.

These homogeneous or heterogeneous processing devices may share virtual memory address spaces via physical memory 105 and optionally through last level cache, LLC 116. Typically, the homogeneous processor cores may have cache hierachies, e.g. I-cache 123, D-cache 124, L2 126 and I-cache 143, D-cache 144, L2 166, respectively; and TLBs, e.g. I-TLB 121, D-TLB 122 and I-TLB 141, D-TLB 142, respectively to cache virtual to physical address translations from the system, OS 154, page tables, PTBL 152, in a paged virtual memory system.

The homogeneous processor cores 102 and 104 may also include page-miss handlers, PMH 130 and PMH 150, in hardware to perform page walks through system page tables, PTBL 152. When one of these homogeneous processor cores 102 and 104 tries to access a page in virtual memory that is not mapped to anything in physical memory 105, the memory access will cause a page fault, and the operating system, OS 154, will be invoked to "fix" the problem.

The heterogeneous processing devices, such as graphics processor, GFX 106, and device 109 may also have mechanisms such as TLBs for performing virtual to physical address translations, but typically there is some software that runs on the homogeneous processor cores 102 and 104 and may communicate with drivers for the heterogeneous processing devices GFX 106 and device 109 to set up page tables, etc. for some limited sharing of the paged virtual memory system with the heterogeneous processing devices GFX 106 and device 109. But unlike in the homogeneous processor cores 102 and 104, these mechanisms may have limited capabilities, lacking the ability to handle page faults, for example. Therefore the pages that are shared with these heterogeneous processing devices may need to be locked down in physical memory 105, preventing the operating system, OS 154, from paging them in from, and out to disk as demand dictates. Thus the number of applications that can be supported may be limited, or the amount of physical memory required may be greater than it would otherwise have been. Further the software that runs on the homogeneous processor 102 or 104 to set up page tables, etc. for sharing paged virtual memory with the heterogeneous processing devices GFX 106 and device 109 incurs a performance overhead, which may reduce the effectiveness of using the heterogeneous processing devices GFX 106 and device 109.

When software running on the homogeneous processor cores 102 and 104 (e.g. the operating system, OS 154) makes changes to the page tables, PTBL 152, the corresponding translations that are cached in various TLBs, i.e. I-TLB 121, D-TLB 122 and I-TLB 141, D-TLB 142, respectively, and any TLBs in GFX 106 and/or device 109 must be invalidated. To broadcast an invalidation message to all devices in the system may cause unwanted communication congestion. In order to avoid unwanted congestion, operating system OS 152 may use a lazy invalidation scheme. Since operating system, OS 152, is running on the homogeneous processor cores 102 and 104 and has access to which of the processes, applications or threads are active on the various homogeneous processor cores, it could "shoot-down," or trigger an invalidation of TLB entries as necessary, i.e. only in the TLBs of cores, I-TLB 121, D-TLB 122 and I-TLB 141, D-TLB 142, respectively, which were actively running a process that used that TLB entry, and/or in the TLBs of cores that may want to activate a process that will use that TLB entry. Thus unnecessary activity and overhead for TLB shoot-downs may be avoided, but only for the homogeneous processor cores 102 and 104. Since operating system, OS 152, does not run on heterogeneous processing devices, GFX 106 and device 109, it cannot track which processes are active and which TLB entries may need to be invalidated, even if we assume that the heterogeneous processing devices, GFX 106 and device 109, are capable of recovering the new page table information and generating page faults. Therefore a broadcast would need to be sent to all of heterogeneous processing devices, GFX 106 and device 109, potentially sharing the process virtual address space.

It will be appreciated that as the number of processing cores and other heterogeneous processing devices accessing caches or using virtual memory increases, there may be good reason to expect problems, such as additional memory congestion, and conflicts or race conditions when virtual memory space is shared by more of these devices.

Figure 2:
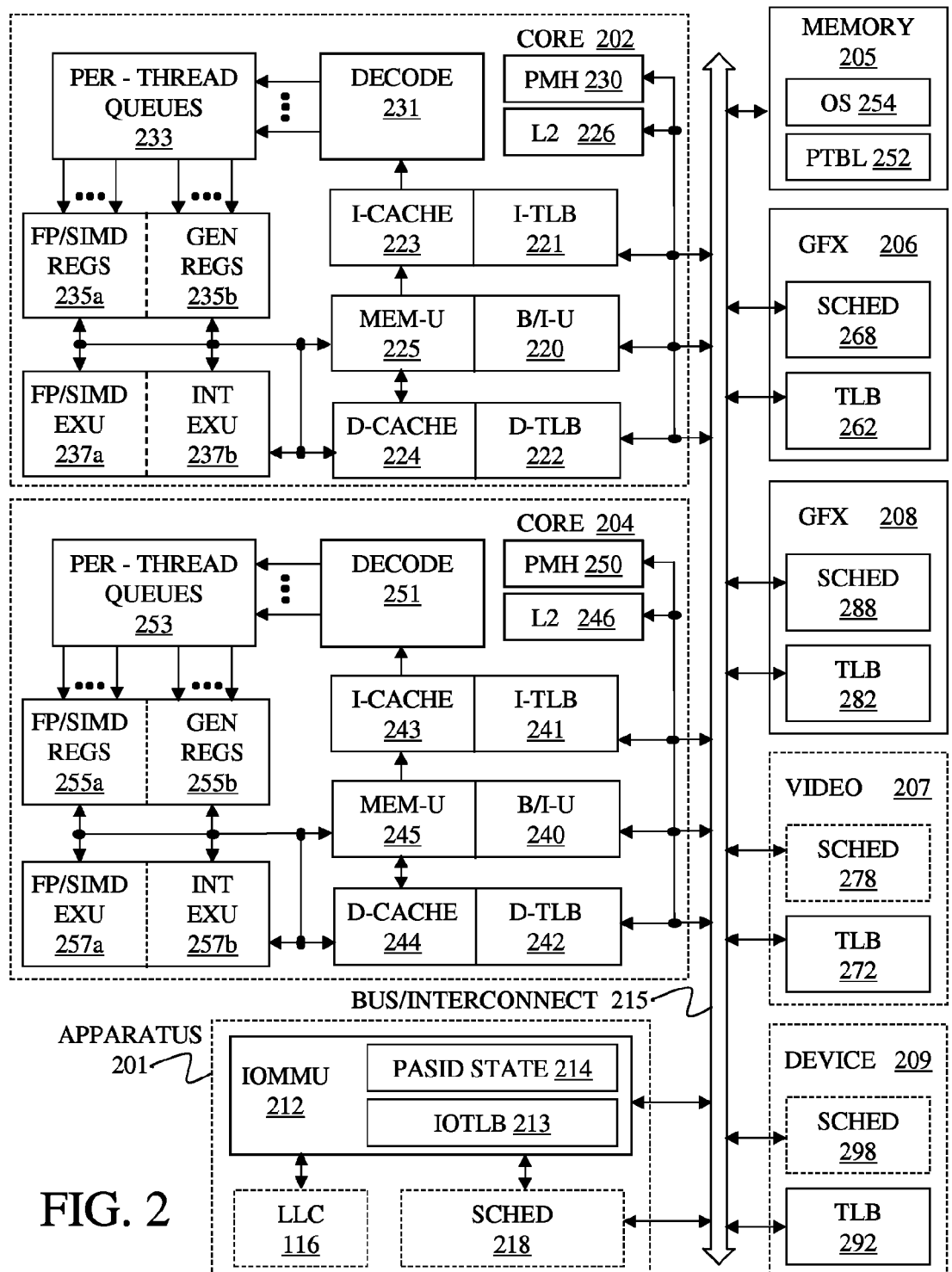
FIG. 2 illustrates one embodiment of an apparatus for sharing virtual memory in a multi-core system with heterogeneous devices, which supports efficient TLB shoot-downs.

FIG. 2 illustrates one embodiment of an apparatus 201 for sharing virtual memory in a multi-core system with heterogeneous devices, which supports efficient TLB shoot-downs. Apparatus 201 comprises IOTLB 213 to store virtual address translation entries. Memory management unit, IOMMU 212, is coupled with the IOTLB 213 and PASID state storage 214, to maintain PASID state entries corresponding to at least a portion of the virtual address translation entries of IOTLB 213. Embodiments of the PASID state entries may each include an active reference state and a lazy-invalidation state, which will be described in greater detail below. For the sake of illustration IOTLB 213 and PASID state storage 214 are shown as being included in IOMMU 212 but it will be appreciated that one or both may be implemented as separate hardware or software data structures and reside outside of IOMMU 212, for example in memory 205.

Apparatus 201 optionally comprises also last level cache, LLC 116, and scheduler 218, which are shown as being included in IOMMU 212 but may be implemented as separate hardware or software and may reside outside of IOMMU 212.

Apparatus 201 is operatively coupled with bus/interconnect 215 for communicating with a multi-core processor or multi-core processing system having heterogeneous devices and for sharing virtual memory, via memory 205, in the multi-core system with heterogeneous devices. The system may include multiple homogeneous cores, two of which are shown as core 202 and core 204, as well as heterogeneous devices such as graphics devices, two of which are shown as GFX 206 and GFX 208, and optionally other heterogeneous devices such as video device 207 and device 209.

The multiple homogeneous cores 202 and 204 may be multi-threaded cores processing multiple process threads for execution via decode 231 and decode 251, per-thread queues 233 and 253, floating point/single-instruction multiple-data registers FP/SIMD REGS 235*a* and FP/SIMD REGS 255*a*, general registers GEN REGS 235*b* and GEN REGS 255*b*, floating point/single-instruction multiple-data execution units FP/SIMD EXU 237*a* and FP/SIMD EXU 257*a*, and integer execution units INT EXU 237*b* and INT EXU 257*b*, respectively. Core 202 and core 204 may also be coupled with memory 205 via a bus/interconnect 215 and memory units MEM-U 225 and MEM-U 245 through bus/interconnect units B/I-U 220 and B/I-U 240, respectively. Core 202 and core 204 may also be coupled with heterogeneous processing devices GFX 206 and GFX 208, and optionally other heterogeneous devices such as video device 207 and device 209 via memory 205 and bus/interconnect 215 and optionally via last level cache, LLC 116.

These homogeneous or heterogeneous processing devices may share virtual memory address spaces via memory 205 and optionally through last level cache, LLC 116. Typically, the homogeneous processor cores may have cache hierachies, e.g. I-cache 223, D-cache 224, L2 226 and I-cache 243, D-cache 244, L2 266, respectively; and TLBs, e.g. I-TLB 221, D-TLB 222 and I-TLB 241, D-TLB 242, respectively to cache virtual to physical address translations from the system, OS 254, page tables, PTBL 252, in a paged virtual memory system.

The homogeneous processor cores 202 and 204 may also include page-miss handlers, PMH 230 and PMH 250, in hardware to perform page walks through system page tables, PTBL 252. When one of these homogeneous processor cores 202 and 204 tries to access a page in virtual memory that is not mapped to anything in physical memory 205, the memory access will cause a page fault, and the operating system, OS 254, will be invoked to "fix" the problem.

The heterogeneous processing devices, such as graphics processors, GFX 206 and GFX 208, and optionally other heterogeneous devices such as video device 207 and device 209 may also have mechanisms such as TLBs, e.g. TLB 262, TLB 282, TLB 272 and TLB 292, respectively, for performing virtual to physical address translations. Various embodiments of TLB 262, TLB 282, TLB 272 and TLB 292, respectively, may or may not have the same capabilities, or capabilities comparable to homogeneous processor cores 202 and 204. The heterogeneous processing devices GFX 206, GFX 208, and optionally video device 207 and device 209 may also have schedulers, e.g. SCHED 268, SCHED 288, SCHED 278 and SCHED 298, respectively, for scheduling process threads for execution on heterogeneous processing devices GFX 206, GFX 208, video device 207 and device 209. The schedulers, SCHED 268, SCHED 288, SCHED 278 and SCHED 298, respectively, and optionally including a central scheduler SCHED 218, may issue PASID state update requests from the heterogeneous processing devices in order to activate, or to deactivate a process thread on that device.

Memory management unit, IOMMU 212, may receive one or more PASID state update requests from one or more respective requesting devices of a plurality of heterogeneous devices in the multi-core system. When processing a PASID state update request from one of the requesting devices, IOMMU 212 may perform an atomic modification of the PASID state corresponding to that PASID state update request. One embodiment of such an atomic modification may be in the form of an atomic read-modify-write operation, in which IOMMU 212 may read the lazy-invalidation state of the PASID state entry and perform a lazy invalidation check for the corresponding PASID state, for example to see if a virtual address translation entry for the process address space needs to be synchronized with system page tables prior to being activated by the requesting device. The IOMMU 212 may then send a PASID state update response to the requesting device corresponding to the PASID state update request, for example, telling the requesting device to synchronize the device's TLB entry prior to activation in response to the lazy-invalidation state being set.

Embodiments of one or more processes to support efficient TLB shoot-downs for sharing virtual memory in a multi-core system with heterogeneous devices will also be described in greater detail below, in particular with reference to FIGS. 3-4.

Figure 3:
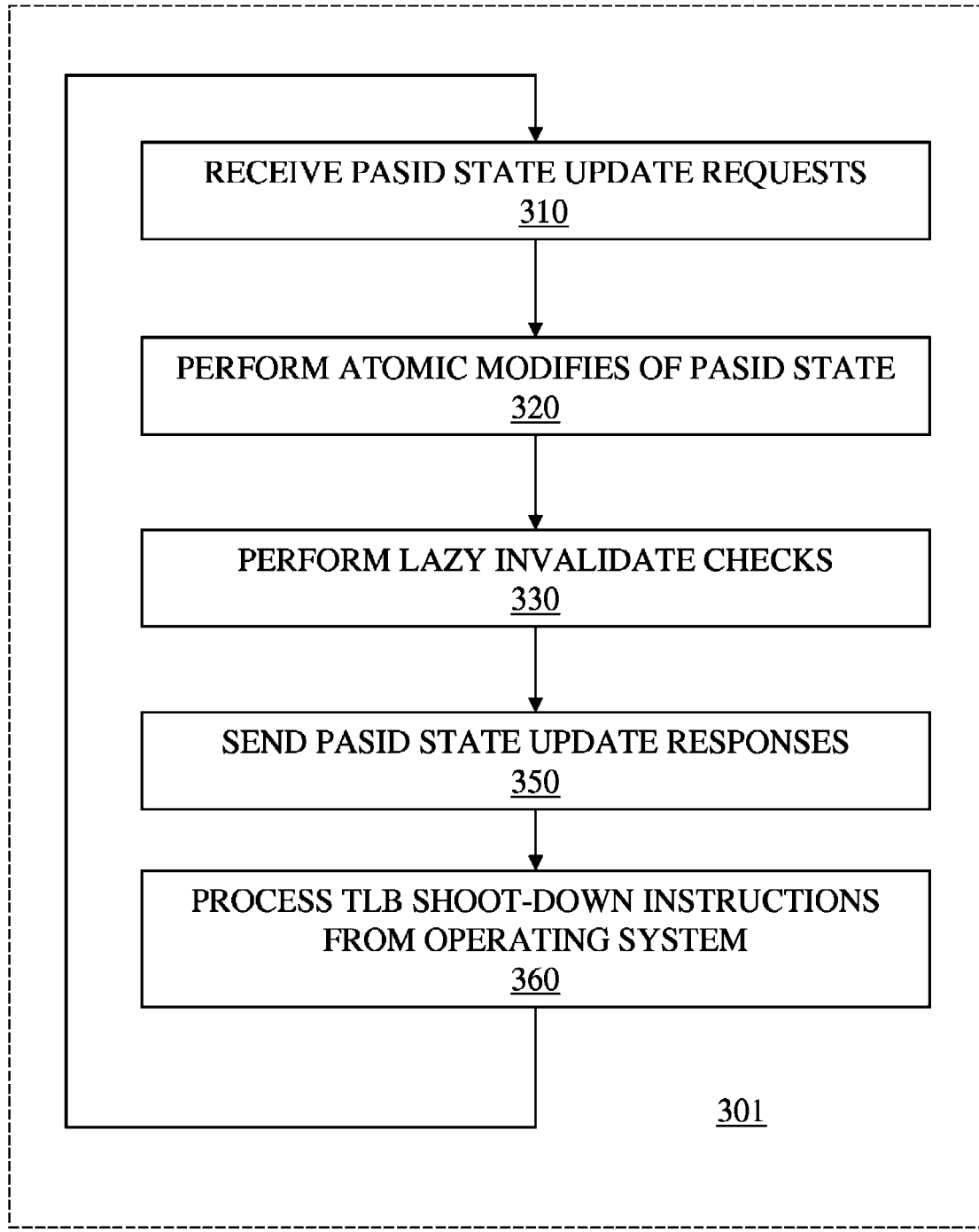
FIG. 3 illustrates a flow diagram for one embodiment of a process to support efficient TLB shoot-downs for sharing virtual memory in a multi-core system with heterogeneous devices.

FIG. 3 illustrates a flow diagram for one embodiment of a process 301 to support efficient TLB shoot-downs for sharing virtual memory in a multi-core system with heterogeneous devices. Process 301 and other processes herein disclosed are performed by processing blocks that may comprise dedicated hardware or software or firmware operation codes executable by general purpose machines or by special purpose machines or by a combination of both.

In processing block 310 of process 301, one or more PASID state update requests is received from one or more respective requesting devices of a plurality of heterogeneous devices in the multi-core system. In processing block 320 an atomic modification of a PASID state is performed corresponding to one of those PASID state update requests, and a lazy invalidation check is performed for the corresponding PASID state in processing block 330. The atomic modification may be in the form of an atomic read-modify-write operation, in which the IOMMU may read the lazy-invalidation state of the PASID state entry and perform a lazy invalidation check for the corresponding PASID state, for example, to see if a virtual address translation entry for the process address space needs to be synchronized with system page tables prior to being activated by the requesting device. Then in processing block 350, a PASID state update response is sent to a requesting device corresponding to that particular PASID state update request, for example, indicating to the requesting device that it needs to synchronize a device TLB entry prior to activation in response to the lazy-invalidation state being set.

Processing of a TLB shoot-down from the operating system of the multi-core system then occurs in processing block 360. Once an IOTLB entry is activated, processing of a TLB shoot-down may begin with invalidating the IOTLB entry. Such processing may also include invalidating device TLB entries of one or more of the heterogeneous devices, for example, if an active reference count in the PASID state entry is non-zero. Alternatively, processing a TLB shoot-down may involve reading a PASID state entry and setting a lazy-invalidate field in the PASID state entry if the active reference count in the PASID state entry is zero, i.e. when no devices are currently using the TLB entry but it may still be activated in some device TLB(s).

It will be appreciated that for the sake of illustration, in some embodiments of process 301, events which cause the processing to occur may take place in other orders or at the same time as other event occurrences. For example a TLB shoot-down may be received from the operating system at any time, while the IOMMU may be processing PASID state update requests. Thus it is important to protect against race conditions and to take care that the ordering of updates to PASID state and TLB entries preserves the correctness of virtual address translations in those structures with respect to changes to the system page tables.

Figure 4:
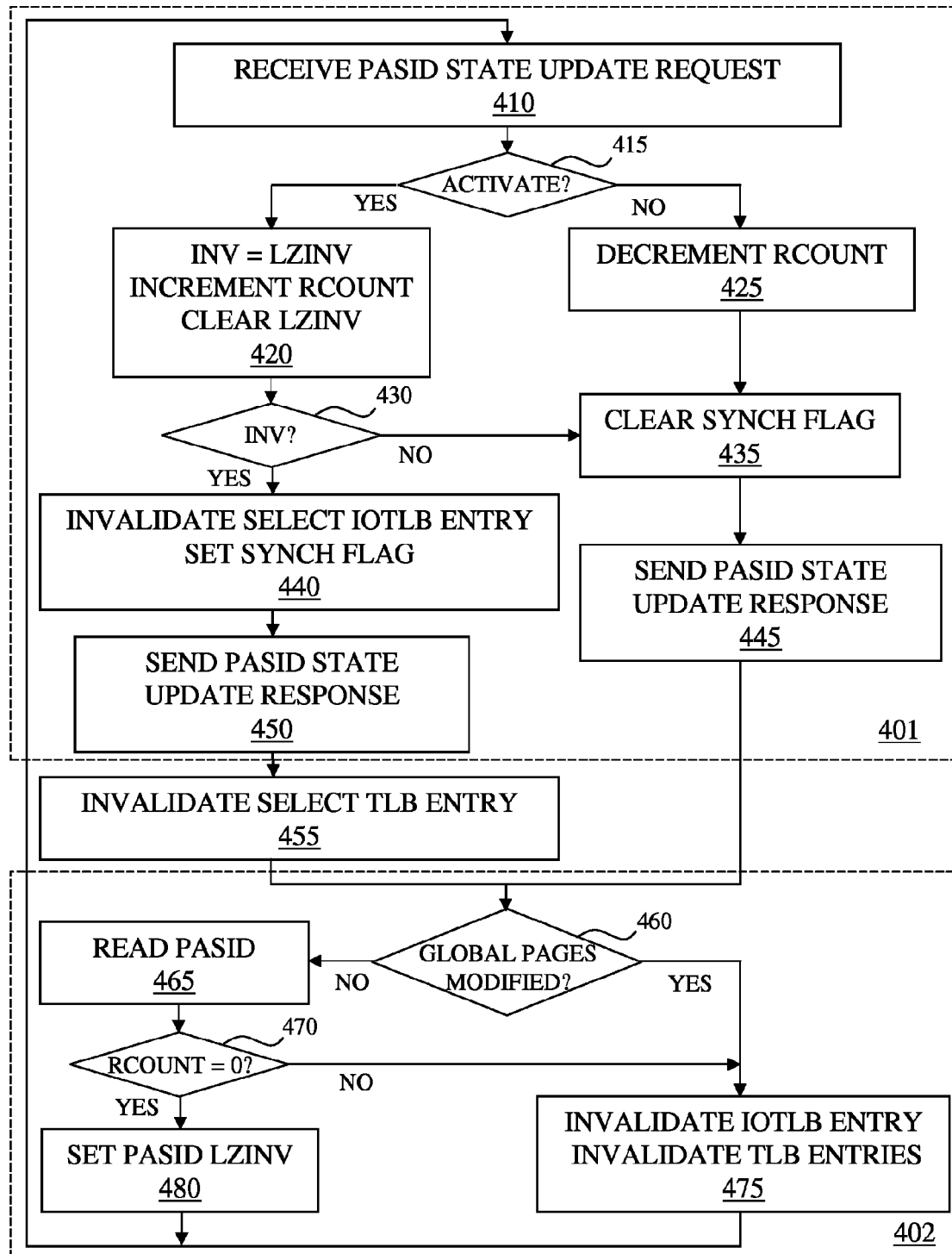
FIG. 4 illustrates a flow diagram for an alternative embodiment of a process to support efficient TLB shoot-downs for sharing virtual memory in a multi-core system with heterogeneous devices.

FIG. 4 illustrates a flow diagram for an alternative embodiment of a process to support efficient TLB shoot-downs for sharing virtual memory in a multi-core system with heterogeneous devices.

In processing block 410 of process 401, a PASID state update request is received from a requesting device of the plurality of heterogeneous devices in the multi-core system. It is determined in processing block 415 if the update request is to activate or to deactivate PASID state for the requesting device. If the request is to activate PASID state for the requesting device, then in processing block 420 an atomic modification of a PASID state is performed corresponding to the PASID state update request, wherein the lazy-invalidation state is read, the active reference count, RCOUNT, is incremented and the lazy-invalidation state is cleared. The atomic modification may be in the form of an atomic read-modify-write operation. Otherwise if the request is to deactivate the PASID state for the requesting device, then in processing block 425 the active reference count, RCOUNT, is decremented.

In processing block 430 a lazy invalidation check is performed for the corresponding PASID state. Since in the atomic modification the IOMMU has read the lazy-invalidation state of the PASID state entry, a lazy invalidation check for the corresponding PASID state may comprise checking the state that was read to see if it was previously set, for example, to determine if a virtual address translation entry for the process address space needs to be synchronized with system page tables prior to being activated by the requesting device.

If so, processing block 440 begins with invalidating the IOTLB entry and further includes setting a synchronization flag invalidating device TLB entries of one or more of the heterogeneous devices that need to be synchronized with system page tables, since the active reference count in the PASID state entry is now non-zero and the lazy-invalidation state was previously set. Then in processing block 450, a PASID state update response is sent to a requesting device corresponding to that particular PASID state update request, with the synchronization flag set, indicating to the requesting device that it needs to synchronize the device TLB entry prior to activation.

Otherwise processing proceeds to processing block 435, as it would in the case of a deactivation request, where the synchronization flag is cleared. Then in processing block 445, a PASID state update response is sent to a requesting device corresponding to that particular PASID state update request, with the synchronization flag cleared, indicating to the requesting device that it does not need to synchronize the device TLB entry prior to activation.

In processing block 455, the requesting device may need to synchronize the device TLB entry prior to activation, based on the setting of the synchronization flag in the PASID state update response. It will be appreciated that in this way the synchronization flag will be set whenever the active reference count in the PASID state entry increments from zero to one and the lazy-invalidation state was previously set. Other embodiments of synchronization based on lazy-invalidation state and for multiple devices may also be used.

Processing of a TLB shoot-down from the operating system of the multi-core system then occurs in process 402 starting in processing block 460 where it is determined if global pages have been modified. If so, processing of the TLB shoot-down may include invalidating the IOTLB entry and all corresponding device TLB entries of the heterogeneous devices in processing block 475. Otherwise, processing may proceed to processing block 465 where the corresponding PASID state entry is read. Then in processing block 470, it is determined if the active reference count in the PASID state entry is zero. If not, processing of the TLB shoot-down again includes invalidating the IOTLB entry and all corresponding device TLB entries of the heterogeneous devices in processing block 475. But if the active reference count in the PASID state entry is zero, then the lazy-invalidation field in the PASID state entry is set to trigger lazy-invalidation as described above with regard to processing blocks 420, 430 and 440. Processing then reiterates beginning with processing block 410 of process 401.

It will be appreciated that for the sake of illustration, in some embodiments of processes 401 and 402, events which cause the processing of processes 401 and 402 to occur may take place in other orders or at the same time. For example a TLB shoot-down may be received from the operating system at any time and cause the processing of process 402 to occur, while the IOMMU may be processing PASID state update requests in process 401. Thus it is important to protect against race conditions and to take care that the ordering of updates to PASID state and TLB entries preserves the correctness of virtual address translations in those structures with respect to changes to the system page tables. Atomic operations such as read-modify-write, and test-andset, or other techniques for handling critical sections (e.g. semaphores) may be used in various embodiments by those of skill in the art to accomplish these goals.

Figure 5:
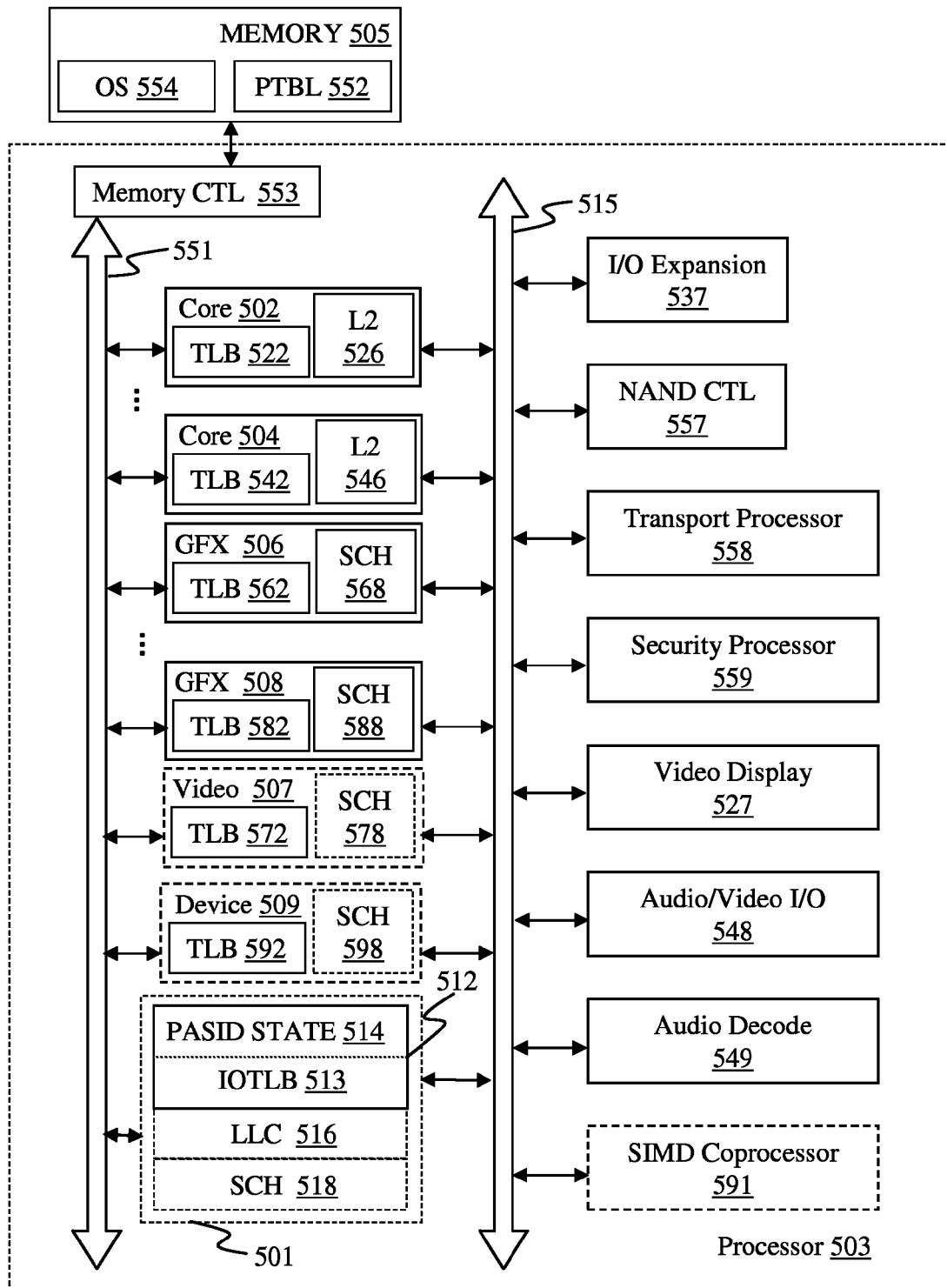
FIG. 5 illustrates one embodiment of a processor that utilizes a process and an apparatus to support efficient TLB shoot-downs for sharing virtual memory in a multi-core system with heterogeneous devices.

FIG. 5 illustrates one embodiment of a processor 503 that utilizes a process, e.g. process 301, and an apparatus 501 to support efficient TLB shoot-downs for sharing virtual memory in a multi-core system with heterogeneous devices 506-509. Apparatus 501 of processor 503 comprises IOTLB 513 to store virtual address translation entries. Memory management unit (MMU) 512, is coupled with the IOTLB 513 and PASID state storage 514, to maintain PASID state entries corresponding to at least a portion of the virtual address translation entries of IOTLB 513. Embodiments of the PASID state entries may each include an active reference state and a lazy-invalidation state. For the sake of illustration IOTLB 513 and PASID state storage 514 are shown as being included in MMU 512 but it will be appreciated that one or both may be implemented as separate hardware or software data structures and reside outside of MMU 512, for example in memory 505.

Apparatus 501 of processor 503 optionally comprises also last level cache, LLC 516, and scheduler 518, which are also shown as being included in MMU 512 but may be implemented as separate hardware or software and may reside outside of MMU 512.

Apparatus 501 of processor 503 is operatively coupled with bus/interconnects 515 and 551 for communicating with a multi-core processor or multi-core processing system having heterogeneous devices and for sharing virtual memory, via memory control 553 through memory 505, in the multi-core system with heterogeneous devices. The system may include multiple homogeneous cores, two of which are shown as core 502 and core 504, as well as heterogeneous devices such as graphics devices, two of which are shown as GFX 506 and GFX 508, and optionally other heterogeneous devices such as video device 507 and device 509.

The multiple homogeneous cores 502 and 504 may be multi-threaded cores processing multiple process threads for execution as described, for example, with regard to FIG. 2. Core 502 and core 504 may be coupled with various devices via a bus/interconnect 515, e.g. I/O expansion device 537, NAND control 557, transport processor 558, security processor 559, video display logic 527, audio/video I/O 548, audio decode logic 549, and optionally single-instruction-multiple-data (SIMD) coprocessor 591. Core 502 and core 504 may also be coupled with memory 505 via a bus/interconnect 551 and memory control 553. Core 502 and core 504 may also be coupled with heterogeneous processing devices GFX 506 and GFX 508, and optionally other heterogeneous devices such as video device 507 and device 509 via memory 505 and bus/interconnects 515 and 551 and optionally via last level cache, LLC 516.

These homogeneous or heterogeneous processing devices may share virtual memory address spaces via memory 505 and optionally through last level cache, LLC 516. Typically, the homogeneous processor cores may have cache hierachies, e.g. including L2 526 and L2 546, respectively; and TLBs, e.g. TLB 522 and TLB 242, respectively to cache virtual to physical address translations from the system, OS 554, page tables, PTBL 552, in a paged virtual memory system.

The homogeneous processor cores 502 and 504 may also include page-miss handlers (not shown) in hardware to perform page walks through system page tables, PTBL 552. When one of these homogeneous processor cores 502 and 504 tries to access a page in virtual memory that is not mapped to anything in physical memory 505, the memory access will cause a page fault, and the operating system, OS 554, will be invoked to "fix" the problem.

The heterogeneous processing devices, such as graphics processors, GFX 506 and GFX 508, and optionally other heterogeneous devices such as video device 507 and device 509 may also have mechanisms such as TLBs, e.g. TLB 562, TLB 582, TLB 572 and TLB 592, respectively, for performing virtual to physical address translations. Various embodiments of TLB 562, TLB 582, TLB 572 and TLB 592, respectively, may or may not have the same capabilities, or capabilities comparable to homogeneous processor cores 502 and 504. The heterogeneous processing devices GFX 506, GFX 508, and optionally video device 507 and device 509 may also have schedulers, e.g. SCH 568, SCH 588, SCH 578 and SCH 598, respectively, for scheduling process threads for execution on heterogeneous processing devices GFX 506, GFX 508, video device 507 and device 509. The schedulers, SCH 568, SCH 588, SCH 578 and SCH 598, respectively, and optionally including a central scheduler SCH 518, may issue PASID state update requests from the heterogeneous processing devices in order to activate, or to deactivate a process thread on that device.

Memory management unit 512, may receive one or more PASID state update requests from one or more respective requesting devices of a plurality of heterogeneous devices in the multi-core system. When processing a PASID state update request from one of the requesting devices, MMU 512 may perform an atomic modification of the PASID state corresponding to that PASID state update request. One embodiment of such an atomic modification may be in the form of an atomic read-modify-write operation, in which MMU 512 may read the lazy-invalidation state of the PASID state entry and perform a lazy invalidation check for the corresponding PASID state, for example to see if a virtual address translation entry for the process address space needs to be synchronized with system page tables prior to being activated by the requesting device. The MMU 512 may then send a PASID state update response to the requesting device corresponding to the PASID state update request, for example, telling the requesting device to synchronize the device's TLB entry prior to activation in response to the lazy-invalidation state being set.

Figure 6:
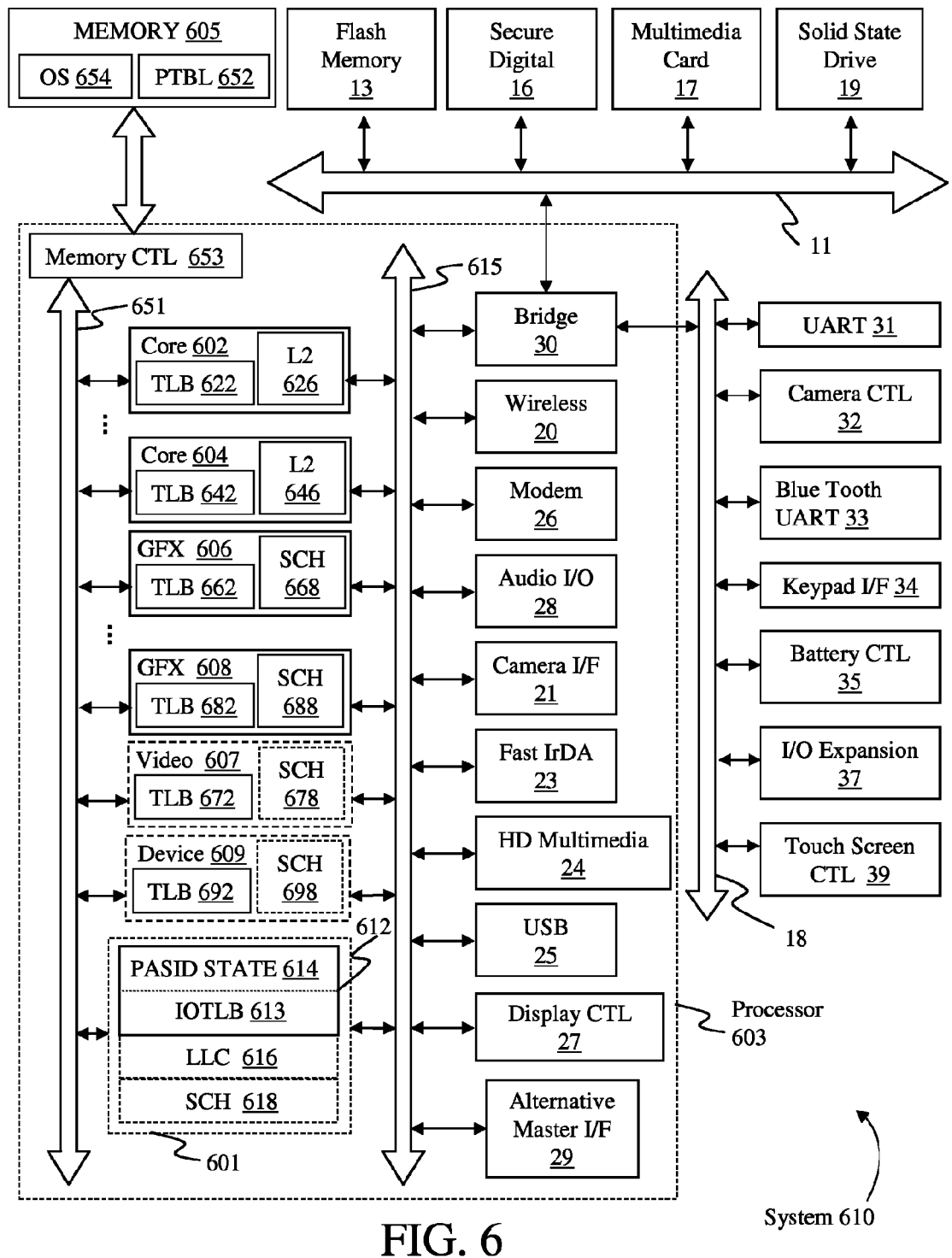
FIG. 6 illustrates one embodiment of a system that utilizes a process and an apparatus to support efficient TLB shoot-downs for sharing virtual memory in a multi-core system with heterogeneous devices.

FIG. 6 illustrates one embodiment of a system 610 that utilizes a process, e.g. process 301, and an apparatus 601 to support efficient TLB shoot-downs for sharing virtual memory in a multi-core system with heterogeneous devices 606-609.

System 610 includes apparatus 601 of processor 603, which comprises IOTLB 613 to store virtual address translation entries. Memory management unit 612, is coupled with the IOTLB 613 and PASID state storage 614, to maintain PASID state entries corresponding to at least a portion of the virtual address translation entries of IOTLB 613. Embodiments of the PASID state entries may each include an active reference state and a lazy-invalidation state. For the sake of illustration IOTLB 613 and PASID state storage 614 are shown as being included in MMU 612 but it will be appreciated that one or both may be implemented as separate hardware or software data structures and reside outside of MMU 612, for example in memory 605.

Apparatus 601 of processor 603 optionally comprises also last level cache, LLC 616, and scheduler 618, which are also shown as being included in MMU 612 but may be implemented as separate hardware or software and may reside outside of MMU 612.

Apparatus 601 of processor 603 is operatively coupled with bus/interconnects 615 and 651 for communicating with a multi-core processor or multi-core processing system having heterogeneous devices and for sharing virtual memory, via memory control 653 through memory 605, in the multi-core system with heterogeneous devices. Embodiments of system 610 may be implemented using standard or non-standard or proprietary technologies, interfaces, busses or interconnects 615 and 651 such as the (Peripheral Component Interconnect) PCI or PCI Express or (Serial Advanced Technology Attachment) SATA for communicating with a multi-core processor or multi-core processing system.

Other embodiments of system 610 may be implemented using standard or non-standard or proprietary technologies, interfaces, busses or interconnects—for example, the SPI (Serial Peripheral Interface) bus; the ISA (Industry Standard Architecture) bus, PC/104, PC/104+ and Extended ISA; USB (Universal Serial Bus) AVC (Audio Video Class); AMBA (Advanced Microcontroller Bus Architecture) (Advanced Peripheral Bus) APB; FireWire (IEEE Std 1394a-2000 High Performance Serial Bus—Amendment 1, ISBN 0-7381-1958-X; IEEE Std 1394b-2002 High Performance Serial Bus—Amendment 2, ISBN 0-7381-3253-5; IEEE Std 1394c-2006, 2007-06-08, ISBN 0-7381-5237-4); HDMI (High-Definition Multimedia Interface); the VESA's (Video Electronic Standards Association) DisplayPort and Mini DisplayPort; the MIPI® (Mobile Industry Processor Interface) Alliance's SLIMbus® (Serial Low-power Inter-chip Media Bus), LLI (Low Latency Interface), CSI (Camera Serial Interface) DSI (Display Serial Interface), etc.

System 610 may include multiple homogeneous cores, two of which are shown as core 602 and core 604, as well as heterogeneous devices such as graphics devices, two of which are shown as GFX 606 and GFX 608, and optionally other heterogeneous devices such as video device 607 and device 609.

The multiple homogeneous cores 602 and 604 may be multi-threaded cores processing multiple process threads for execution. Homogeneous processor core 602 and core 604 may be coupled with various devices via a bus/interconnect 615, e.g. bridge 30, wireless connectivity device 20, modem device 26, and audio I/O devices 28. Some embodiments of system 610 may be implemented as a system on a chip, for example, to use in a tablet computer or a smart phone. In such embodiments wireless connectivity device 20 may provide a wireless LAN (local area network) link, modem device 26 may provide a 4G (fourth generation), 5G (fifth generation), or later telephone link, and audio I/O devices 28 may provide a set of audio human interface devices, for example, a headset, speakers, handset microphone, audio input and output channels, and amplifiers.

Homogeneous processor cores 602 and 604 are coupled with bus/interconnect 615, bridge 30 and bus/interconnect 18 for communicating with various other system devices, which may include but are not limited to wireless connectivity device 20, modem device 26, and audio I/O devices 28, camera interface 21, Fast IrDA (Infrared Data Association) port 23, HD (high definition) multimedia interface 24, USB 25, display control 27, and alternate master interface 29. Homogeneous processor cores 602 and 604 are also coupled with bus/interconnect 615, bridge 30 and bus/interconnect 11 for communicating with various other system devices, which may include but are not limited to flash memory 13, SD (secure digital) memory 16, MMC (multimedia card) 17 and SSD (solid state drive) 19. Homogeneous processor cores 602 and 604 are coupled with bus/interconnect 615, bridge 30 and bus/interconnect 18 for communicating with various other system devices, which may include but are not limited to UART (universal asynchronous receiver/transmitter) 31, camera control 32, Blue Tooth UART 33 optionally including a Wi-Fi 802.11a/b/g transceiver and/or a GPS (Global Positioning System) transceiver, keypad 634, battery control 35, I/O expansion 37 and touch screen control 39.

Homogeneous processor core 602 and core 604 may also be coupled with memory 605 via a bus/interconnect 651 and memory control 653. Homogeneous processor core 602 and core 604 may also be coupled with heterogeneous processing devices GFX 606 and GFX 608, and optionally other heterogeneous devices such as video device 607 and device 609 via memory 605 and bus/interconnects 615 and 651 and optionally via last level cache, LLC 616. Memory 605 and other tangible storage media of system 610 may record functional descriptive material including executable instructions of OS 654, MMU 612, SCH 618, 668, 678, 688 and 698 and of other devices and/or drivers (not shown) which may be executed by homogeneous processor cores 602 and 604 to support efficient TLB shoot-downs for sharing virtual memory in a multi-core system with heterogeneous devices 606-609.

Some embodiments of system 610 may adhere to industry standards which allow multiple operating systems running simultaneously within a single computer to natively share devices like Single Root I/O Virtualization (SRIOV), which provides native I/O virtualization in PCI Express topologies, or Multi-Root I/O Virtualization (MRIOV), which provides native I/O virtualization in topologies where multiple root complexes share a PCI Express hierarchy. Some preferred embodiments of system 610 may include standard or non-standard or proprietary technologies, interfaces, busses or interconnects such as the SPI bus, USB, AMBA APB; FireWire, HDMI, Mini DisplayPort, MIPI SLIMbus, MIPI LLI, MIPI CSI, MIPI DSI, etc.

These homogeneous or heterogeneous processing devices may share virtual memory address spaces via memory 605 and optionally through last level cache, LLC 616. Typically, the homogeneous processor cores may have cache hierachies, e.g. L2 626 and L2 646, respectively; and TLBs, e.g. TLB 622 and TLB 642, respectively to cache virtual to physical address translations from a host or guest system, OS 654, page tables, PTBL 652, in a paged virtual memory system.

The homogeneous processor cores 602 and 604 may also include page-miss handlers (not shown) in hardware to perform page walks through system page tables, PTBL 652. When one of these homogeneous processor cores 602 and 604 tries to access a page in virtual memory that is not mapped to anything in physical memory 605, the memory access will cause a page fault, and the operating system, OS 654, will be invoked to "fix" the problem.

The heterogeneous processing devices, such as graphics processors, GFX 606 and GFX 608, and optionally other heterogeneous devices such as video device 607 and device 609 may also have mechanisms such as TLBs, e.g. TLB 662, TLB 682, TLB 672 and TLB 692, respectively, for performing virtual to physical address translations. Various embodiments of TLB 662, TLB 682, TLB 672 and TLB 692, respectively, may or may not have the same capabilities, or capabilities comparable to homogeneous processor cores 602 and 604. The heterogeneous processing devices GFX 606, GFX 608, and optionally video device 607 and device 609 may also have schedulers, e.g. SCH 668, SCH 688, SCH 678 and SCH 698, respectively, for scheduling process threads for execution on heterogeneous processing devices GFX 606, GFX 608, video device 607 and device 609. The schedulers, SCH 668, SCH 688, SCH 678 and SCH 698, respectively, and optionally including a central scheduler SCH 618, may issue PASID state update requests from the heterogeneous processing devices in order to activate, or to deactivate a process thread on that device.

Memory management unit 612, may receive one or more PASID state update requests from one or more respective requesting devices of a plurality of heterogeneous devices in the multi-core system. When processing a PASID state update request from one of the requesting devices, MMU 612 may perform an atomic modification of the PASID state corresponding to that PASID state update request. One embodiment of such an atomic modification may be in the form of an atomic read-modify-write operation, in which MMU 612 may read the lazy-invalidation state of the PASID state entry and perform a lazy invalidation check for the corresponding PASID state, for example to see if a virtual address translation entry for the process address space needs to be synchronized with system page tables prior to being activated by the requesting device. The MMU 612 may then send a PASID state update response to the requesting device corresponding to the PASID state update request, for example, telling the requesting device to synchronize the device's TLB entry prior to activation in response to the lazy-invalidation state being set.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. An apparatus comprising:
a TLB to store a plurality of virtual address translation entries; and
a memory management unit, coupled with the TLB, to maintain PASID state entries corresponding to a portion of the virtual address translation entries, each of said PASID state entries including an active reference count and a lazy-invalidation field,
said memory management unit to perform an atomic modification of a first PASID state entry responsive to receiving a first PASID state update request from a device of a plurality of heterogeneous devices in a multi-core system and to read the lazy-invalidation state of the first PASID state entry,
the memory management unit to send a PASID state update response to the device to synchronize a device TLB entry prior to activation responsive at least in part to the lazy-invalidation state read.

2. The apparatus of claim 1 wherein the atomic modification of the first PASID state comprises:
reading the first PASID state entry including the lazy-invalidate state;
incrementing an active reference count if the first PASID state update request indicates an activation update; and
clearing the lazy-invalidate state if the first PASID state update request indicates an activation update.

3. The apparatus of claim 1 wherein the memory management unit responsive at least in part to the lazy-invalidation state read is further to:

invalidate a TLB virtual address translation entry corresponding to the first PASID state entry; and
set a synchronization flag for the PASID state update response sent to the device.

4. The apparatus of claim 1 wherein the memory management unit is further to:
process a TLB shoot-down from an operating system in the multi-core system.

5. The apparatus of claim 4 wherein processing a TLB shoot-down comprises:
invalidating a TLB virtual address translation entry.

6. The apparatus of claim 4 wherein processing a TLB shoot-down comprises:
causing a device TLB entry of one of the plurality of heterogeneous devices to be invalidated.

7. The apparatus of claim 4 wherein processing a TLB shoot-down comprises:
reading a PASID state entry; and
setting a lazy-invalidate field in the PASID state entry if an active reference count in the PASID state entry is zero.

8. The apparatus of claim 7 wherein processing a TLB shoot-down comprises:
invalidating a TLB entry if the active reference count in the PASID state entry is not zero; and
causing a device TLB entry of one of the plurality of heterogeneous devices to be invalidated if the active reference count in the PASID state entry is not zero.

9. The apparatus of claim 7 wherein setting a lazy-invalidate field in the PASID state entry is performed using a locked compare-and-exchange instruction.

10. A multi-core processor comprising:
a first plurality of homogeneous processing cores;
a heterogeneous processing device;
a TLB to store a plurality of virtual address translation entries; and
a memory management unit, coupled with the TLB, to maintain PASID state entries corresponding to a portion of the virtual address translation entries, each of said PASID state entries including an active reference count and a lazy-invalidation field,
said memory management unit to perform an atomic modification of a first PASID state entry responsive to receiving a first PASID state update request from a device of a plurality of heterogeneous devices in the multi-core processor and to read the lazy-invalidation state of the first PASID state entry,
the memory management unit to send a PASID state update response to the device to synchronize a device TLB entry prior to activation responsive at least in part to the lazy-invalidation state read.

11. The multi-core processor of claim 10 wherein the atomic modification of the first PASID state entry comprises:
reading the first PASID state entry including the lazy-invalidate state;
incrementing an active reference count if the first PASID state update request indicates an activation update; and
clearing the lazy-invalidate state if the first PASID state update request indicates an activation update.

12. The multi-core processor of claim 10 wherein the memory management unit is further to process a TLB shoot-down from an operating system.

13. The multi-core processor of claim 12 wherein processing a TLB shoot-down comprises:
reading a PASID state entry; and setting a lazy-invalidate field in the PASID state entry if an active reference count in the PASID state entry is zero.

14. The multi-core processor of claim 13 wherein processing a TLB shoot-down comprises:
   invalidating a TLB entry if the active reference count in the PASID state entry is not zero; and
   causing a device TLB entry of one of the plurality of heterogeneous devices to be invalidated if the active reference count in the PASID state entry is not zero.

15. The multi-core processor of claim 13 wherein setting a lazy-invalidate field in the PASID state entry is performed using a locked compare-and-exchange instruction.

16. A multi-core system comprising:
   a memory to store a plurality of page tables containing virtual address translation entries;
   a first plurality of homogeneous processing cores;
   a heterogeneous processing device;
   a TLB to store a plurality of the virtual address translation entries; and
   a memory management unit, coupled with the TLB, to maintain PASID state entries corresponding to a portion of the virtual address translation entries, each of said PASID state entries including an active reference count and a lazy-invalidation field,
   said memory management unit to perform an atomic modification of a first PASID state entry responsive to receiving a first PASID state update request from a device of a plurality of heterogeneous devices in the multi-core system and to read the lazy-invalidation state of the first PASID state entry,
   the memory management unit to send a PASID state update response to the device to synchronize a device TLB entry prior to activation responsive at least in part to the lazy-invalidation state read.

17. The multi-core system of claim 16 wherein the memory management unit is further to:
   process a TLB shoot-down from an operating system in the multi-core system.

18. The multi-core system of claim 17 wherein processing a TLB shoot-down comprises:
   causing a device TLB entry of one of the plurality of heterogeneous devices to be invalidated.

19. The multi-core system of claim 17 wherein processing a TLB shoot-down comprises:
   reading a PASID state entry; and
   setting a lazy-invalidate field in the PASID state entry if an active reference count in the PASID state entry is zero.

20. The multi-core system of claim 19 wherein processing a TLB shoot-down comprises:
   invalidating a TLB entry if the active reference count in the PASID state entry is not zero; and
   causing a device TLB entry of one of the plurality of heterogeneous devices to be invalidated if the active reference count in the PASID state entry is not zero.

* * * * *